United States Patent [19]

Honer

[11] Patent Number: 4,808,263
[45] Date of Patent: Feb. 28, 1989

[54] METHOD FOR FIBERIZING WASTEPAPER USING AN INLINE CONTROL VALVE FOR MAKE-UP AIR

[75] Inventor: Douglas E. Honer, Neenah, Wis.

[73] Assignee: Kimberly-Clark Corporation, Neenah, Wis.

[21] Appl. No.: 177,568

[22] Filed: Apr. 4, 1988

[51] Int. Cl.[4] .............................................. D21B 1/08
[52] U.S. Cl. ........................................ 162/4; 162/61; 162/198; 162/254; 241/62; 137/101.19
[58] Field of Search .................... 162/4, 61, 198, 254, 162/261; 241/57, 62; 137/100, 101.19, 508

[56] References Cited

U.S. PATENT DOCUMENTS 4,615,767  10/1986  Miers et al. ................... 162/4
4,668,339   5/1987  Terry ............................ 162/4

FOREIGN PATENT DOCUMENTS 988942  1/1983  U.S.S.R. .......................... 162/254

OTHER PUBLICATIONS

Karna et al, "Latest Developments Trends in Controlling the Mechanical Groundwood Process", Tappi, Jul., 1988.

Primary Examiner—David L. Lacey
Assistant Examiner—K. M. Hastings
Attorney, Agent, or Firm—Gregory E. Croft

[57] ABSTRACT

Fiberizer efficiency is improved by providing an inline control valve at the fiberizer feed inlet which automatically provides the fiberizer with make-up air proportional to the pressure differential between the fiberizer outlet and inlet. The make-up air tends to distribute the feed material more evenly within the feed inlet and provides a constant fiber/air ratio within the fiberizer.

4 Claims, 4 Drawing Sheets

4,808,263

METHOD FOR FIBERIZING WASTEPAPER USING AN INLINE CONTROL VALVE FOR MAKE-UP AIR

BACKGROUND OF THE INVENTION

Fiberization of wastepaper for a wide variety of purposes is well known. However, recently it has been discovered that wastepaper can be deinked by dry fiberization if the wastepaper is substantially completely fiberized to individual fibers and ink-containing fines. Such a process is disclosed in U.S. Pat. No. 4,668,339 to Terry, issued May 26, 1987, which is herein incorporated by reference. In further developing the process disclosed in the Terry patent it has been found that the operation of the fiberizer cannot be optimized for commercial operation unless the feed rate to the fiberizer is properly regulated in two respects.

First, the distribution of the shredded wastepaper in the inlet duct to the fiberizer must be relatively even over its cross-sectional area or at least concentrated in the center of the inlet duct. Otherwise the wastepaper tends to overload some portions of the fiberizer instead of being evenly distributed around the entire periphery of the working surfaces of the fiberizer. This situation results in inefficient fiberizer operation and can result in some of the feed material being insufficiently fiberized to remove the ink or, alternatively, some of the feed material being over-fiberized causing undesirable damage to the fibers.

Second, the fiber/air ratio within the fiberizer must be maintained relatively constant. This can be difficult in large scale operations where the shredded wastepaper tends to be conveyed to the fiberizer in discontinuous clumps. This results in alternating overload/starvation circumstances within the fiberizer which is not conducive to high efficiency.

Therefore there is a need for a means of providing a fiberizer with an even feed distribution and feed rate.

SUMMARY OF THE INVENTION

In one aspect, the invention resides in a method for fiberizing wastepaper in a fiberizer comprising feeding a mixture of air and suspended pieces of a fibrous material, such as shredded wastepaper, to the feed inlet of the fiberizer through an inline hollow control valve, said control valve having a plurality of radially equally-spaced apart ports through which make-up air is drawn into the fiberizer, wherein the size of the port openings is continuously adjusted in response to the pressure differential between the inlet and outlet of the fiberizer, thereby maintaining a substantially constant fiber/air ratio at the feed inlet of the fiberizer.

In another aspect, the invention resides in a control valve for adjusting the air flow rate to a fiberizer comprising: (a) a hollow valve body adapted for airveying a suspension of shredded fibrous material, said valve body having attachment means at both ends; (b) a plurality of radially equally-spaced apart ports within the valve body, each of said ports having a generally triangular shape; (c) a throttling sleeve, slidably attached to the valve body, adapted to move back and forth over the ports; and (d) means for controllably moving said throttling sleeve in response to pressure differentials between the pressure at the control valve and the pressure at the outlet of the fiberizer.

It has been discovered that the operation of a fiberizer can be improved by providing a substantially constant fiber/air ratio into the fiberizer. Operating in this manner provides a constant retention time in the fiberizer despite variations in the feed rate of the shredded fibrous material, which in turn results in uniform fiberization. This is accomplished by monitoring the change in pressure between the inlet and the outlet of the fiberizer and adjusting the air flow accordingly.

In operation, the rotating impeller blades of the fiberizer create a vacuum at the fiberizer inlet which draws the shredded fibrous material into the fiberizer. The outlet of the fiberizer is at or slightly above atmospheric pressure. As the shredded fibrous material feed rate increases, the effect is to reduce the area between the fiberizer impeller tips and the serrated fiberizing plates (positioned radially around the internal surface of the fiberizer body) by the increasing mass of shredded material. This in turn leads to an increased pressure differential across the fiberizer. Conversely, a reduction in shredded fibrous material feed in effect increases the effective area between the impeller tips and fiberizing plates, resulting in a decrease in pressure differential. In essence, a varying shredded paper feed is analogous to a continuously varying flow control valve within the fiberizer which effectively forces the system to depart from the desired fiber/air flow ratio (pounds of fiber per standard cubic foot per minute of air) necessary for optimal fiber recovery. The amount of the pressure differential variation will depend upon the fiberizer design, the size of the outlet orifice, the blade tip clearance within the fiberizer, and the r.p.m. of the fiberizer. However, for a given fiberizer operating at a given speed, the pressure differential is a function of the shredded fibrous material/air feed rate.

By providing the feed inlet of the fiberizer with an inline control valve in accordance with this invention, the fiber/air ratio can be controlled by opening up the control valve ports as the pressure differential increases or by closing down the control valve ports as the pressure differential decreases. The shape of the ports of the inlet valve is designed to match the performance characteristics of the particular fiberizer and can be developed following determination of the flow curve (equivalent air fan performance curve) since the fiberizer also performs as a transport fan. The purpose of the shape of the ports is to provide a varying amount of fiberizing air as the shredded fibrous material feed varies in order to provide a constant fiber/air flow ratio necessary for optimal fiber recovery. In general the shape of the ports is triangular. In addition, by providing a plurality of ports radially equally-spaced apart, the influx of make-up air tends to concentrate the fibrous feed material in the center of the feed inlet and creates an even distribution of material within the fiberizer.

DETAILED DESCRIPTION OF THE DRAWING

Figure 1:
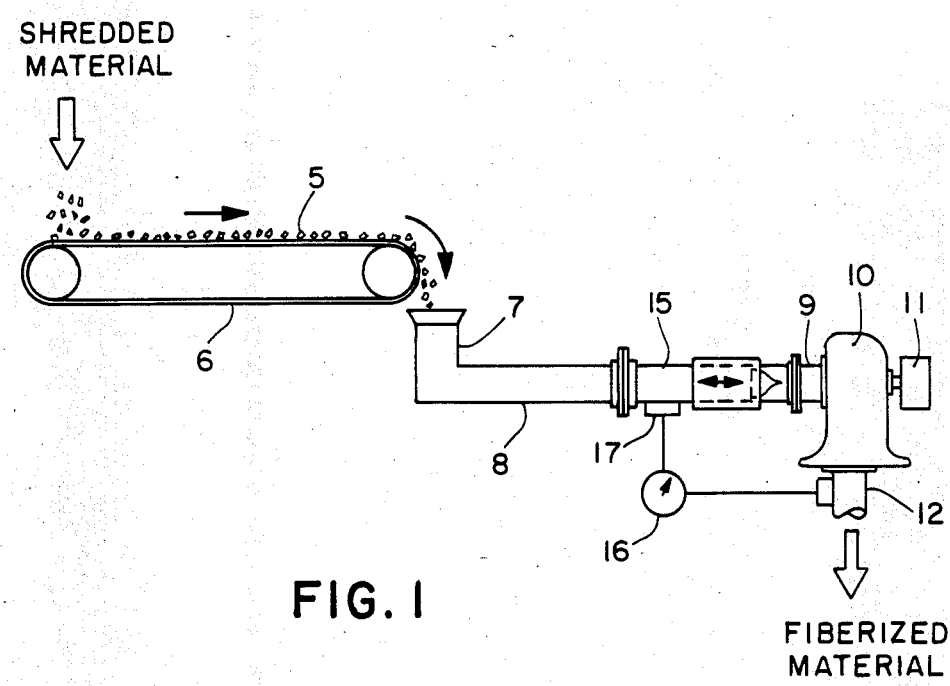
FIG. 1 is a schematic process flow diagram, illustrating the relationship between the fiberizer and the control valve of this invention.

Referring to FIG. 1, the invention will be described in greater detail. As illustrated, shredded fibrous material 5 such as shredded wastepaper is conveyed on an endless moving belt 6 to the intake 7 of a duct 8 connected to the feed inlet 9 of the fiberizer 10. The fiberizer, powered by a suitable drive motor 11, creates a vacuum in the duct 8 and sucks the shredded material into the duct, which airveys the suspended material into the fiberizer. Fiberized material leaves the fiberizer through the fiberizer outlet 12 and is subsequently processed as by separating the fibers from any fines present in the fiberized material.

Prior to entering the fiberizer, the suspended shredded material passes through the control valve 15 of this invention, which controllably allows make-up air to enter the fiberizer through specially designed ports in the control valve. The amount of make-up air is dependent upon the pressure differential between the fiberizer outlet and the fiberizer feed inlet, which is detected by a suitable pressure instrument 16. This instrument in turn signals a control means 17 for opening or closing the control valve ports.

Figure 2:
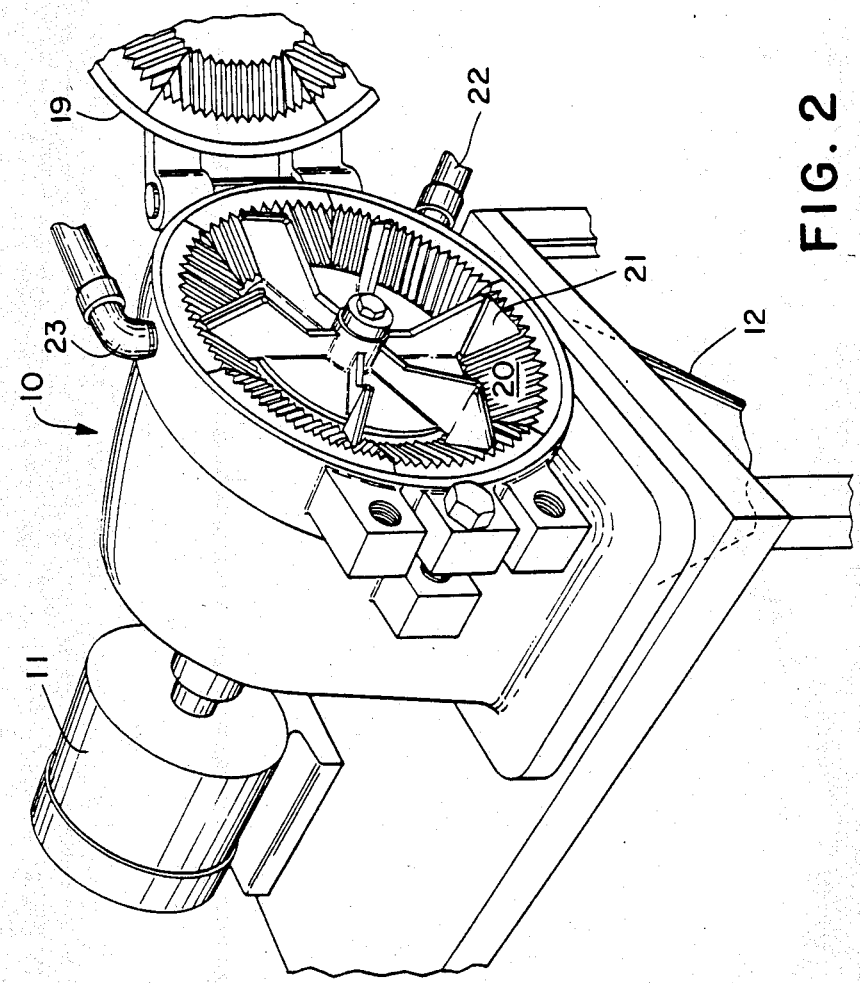
FIG. 2 is a perspective view of a preferred fiberizer for use in connection with this invention.

FIG. 2 illustrates a preferred type of fiberizer useful in connection with this invention. This type of fiberizer is generally referred to as a turbomill. A particular fiberizer of this type is a Pallman Ref. 4 fiberizer as disclosed in U.S. Pat. No. 4,668,339 to Terry, issued May 26, 1987, which is herein incorporated by reference. Shown in FIG. 2 is the fiberizer with the lid 19 open. Also shown is the drive motor 11, a serrated internal working surface 20, and a plurality of rotating impeller blades 21 which are positioned to clear the working surface by a very small distance which can be adjusted to optimize fiberization. The fiberizer is preferably provided with a means for heat removal, as evidenced by a coolant inlet 22 and coolant outlet 23.

Figure 3:
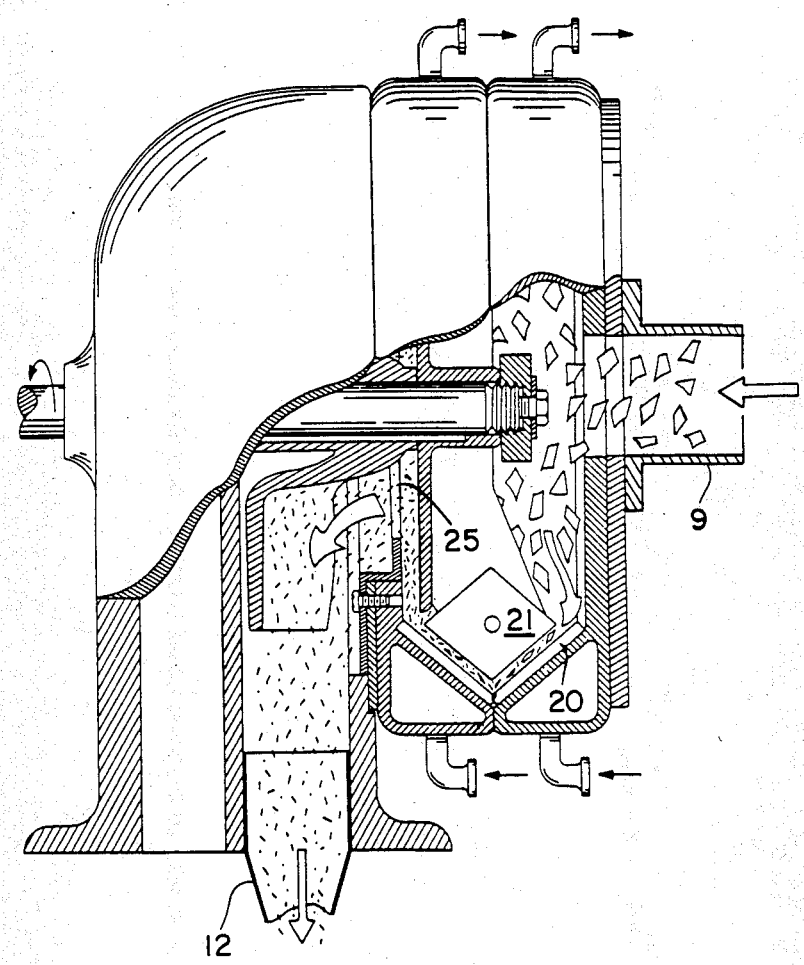
FIG. 3 is a cut-away sectional view o the fiberizer of FIG. 2.

FIG. 3 is a cut-away sectional view of the fiberizer of FIG. 2, illustrating the flow of material through the fiberizer. As shown, the shredded material enters the fiberizer through the feed inlet and is dispersed to the periphery of the fiberizer's internal chamber. The material is then fiberized between the working surface and the rotating impeller blades. The resulting fibers pass through a fixed, but interchangeable, orifice 25 and thereafter leave the fiberizer through the fiberizer outlet.

Figure 4:
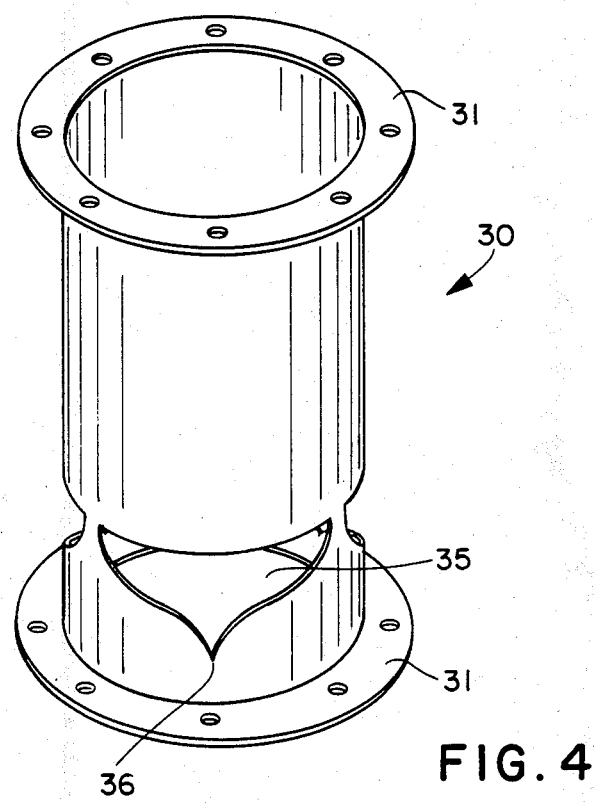
FIG. 4 is a perspective view of a preferred embodiment of the valve body of this invention, illustrating a modified parabolic port opening.

FIG. 4 is a perspective view of a preferred control valve body 30 in accordance with this invention. The control valve body is hollow and cylindrical in shape in order to match up with the cylindrical fiberizer feed inlet and the cylindrical duct providing material to the fiberizer. Each end of the control valve body has an attachment means for interconnecting the control valve to the fiberizer feed inlet and the upstream duct. A flange 31 as shown is preferred, but other connecting means are also suitable. The essential feature of the control valve body is the plurality of radially equally-spaced apart ports 35 which are generally triangular in shape. The sides of the triangular opening can be curvilinear or straight. The control valve body as shown has three ports with two sides of the triangular opening having a modified parabolic shape rather being linear. The difference is a matter of fine tuning the shape of the port to meet the operational characteristics of the particular fiberizer in order to provide a wider range of linear control. It is desirable to operate the control valve about 50-60 percent open at the expected or target flow rates, which can be about 3000 standard cubic feet per minute. Given this requirement, the precise shape of the port openings can be designed based on the fan curve (a plot of discharge pressure as a function of flow rate) for the particular fiberizer being used. Those fiberizers with relatively steep fan curves will require more of a parabolic port opening shape. Nonetheless, the general shape of the ports will be triangular, with a single apex 36 of the triangle pointing downstream (in the direction of the fiberizer). The number of ports can be two or more, with three being preferred. However, four or more ports can be utilized. In part the number of ports will be influenced by the size of the valve body, it being necessary to have sufficient space between port openings for structural integrity. As an example of a preferred control valve in accordance with this invention, the control valve body can be about 38 inches long, having an inside diameter of about 14 inches. The modified parabolic port openings (three in number) each can have an open area of about 30 square inches. Each port opening can be about 8 inches long and can be spaced apart from the adjacent port opening by about 1.25 inches. The sizing of course depends upon the required volume of air.

Figure 5:
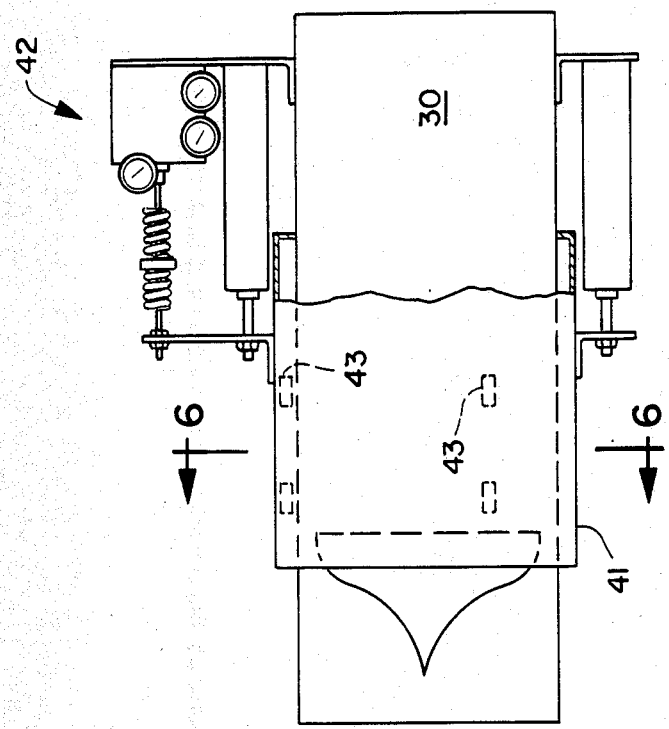
FIG. 5 is a sectional view of the control valve of this invention, illustrating the throttling sleeve and a means for controllably moving the throttling sleeve back and forth over the port openings.

FIG. 5 is a side view of the control valve of this invention. Shown is the valve body 30, the cylindrical throttling sleeve 41, and the control means 42 for slidably moving the throttling sleeve back and forth over the port openings. The throttling sleeve is slidably attached to the control valve body, being supported by three pairs of bearings 43. The size of the throttling sleeve need only be such as to cover the port openings. As an example, for the particular control valve body described above, a throttling sleeve having an internal diameter of about 16 inches and a length of about 17 inches is suitable. The control means essentially consists of a suitable differential pressure transmitter which imparts an instantaneous analog signal relating to the pressure differential into a 3 mode proportional integral derivative (PID) controller, which by means of the PID parameters is "tuned" to optimally control the movement of the throttling sleeve, thus varying the area of the inlet ports and thereby the influx of air in direct relation to the varying feed rate.

Figure 6:
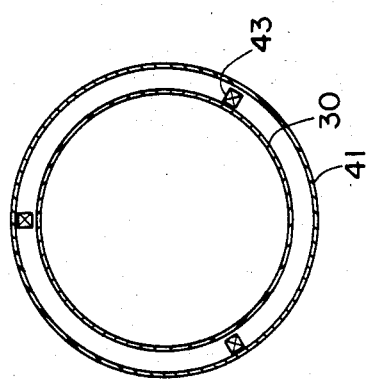
FIG. 6 is an end view of the control valve of this invention, further illustrating the valve body and the throttling sleeve.

FIG. 6 is an end view of the control valve shown in FIG. 5, illustrating the spacing between the control valve body and the throttling sleeve provided by the bearings. The bearings are of aircraft roller bearing design. The space between the throttling sleeve and the control valve body is about 0.75 inch. However, Teflon end seals at each end of the sliding tube effectively prevent the entrance of uncontrollable air between the throttling sleeve and the control valve body.

As an example, in operation it has been found that pressure differentials between the feed inlet and the fiberizer outlet can range from about 5 to about 10 inches water depending upon the fiberizer orifice size, the rotational speed of the impeller blades, the tip clearance and the feed rate of shredded fibrous material.

It will be appreciated that the foregoing description, given for purposes of illustration, is not to be construed as limiting the scope of this invention, which is defined by the following claims.

I claim:

1. A method of fiberizing shredded fibrous material comprising feeding a mixture of air and suspended pieces of the shredded fibrous material to a feed inlet of a fiberizer through a hollow inline control valve said fiberizer having an outlet for fiberized material, and a pressure differential exists between the inlet and the outlet of the fiberizer, monitoring the change in pressure between the inlet and outlet of the fiberizer, and adjusting the air flow by said control valve, said control valve having a plurality of radially equally spaced apart ports each generally triangular in shape which make-up air is drawn into the fiberizer, wherein the size of the port openings is continuously adjusted in response to the pressure differential between the inlet and the outlet of the fiberizer.

2. The method of claim 1 wherein the control valve has three or more ports.

3. The claim 1 wherein the port openings are modified parabolic ports.

4. The method of claim 1 wherein the fibrous material is wastepaper.

* * * * *